A. O. HANSON.
CAN OPENER.
APPLICATION FILED AUG. 26, 1908.

914,829.

Patented Mar. 9, 1909.
2 SHEETS—SHEET 1.

Witnesses
Chas. C. Richardson.
B. E. Cooksey.

Inventor
Albert O. Hanson,
By Chandler & Chandler
Attorneys.

A. O. HANSON.
CAN OPENER.
APPLICATION FILED AUG. 26, 1908.
914,829.
Patented Mar. 9, 1909.
2 SHEETS—SHEET 2.
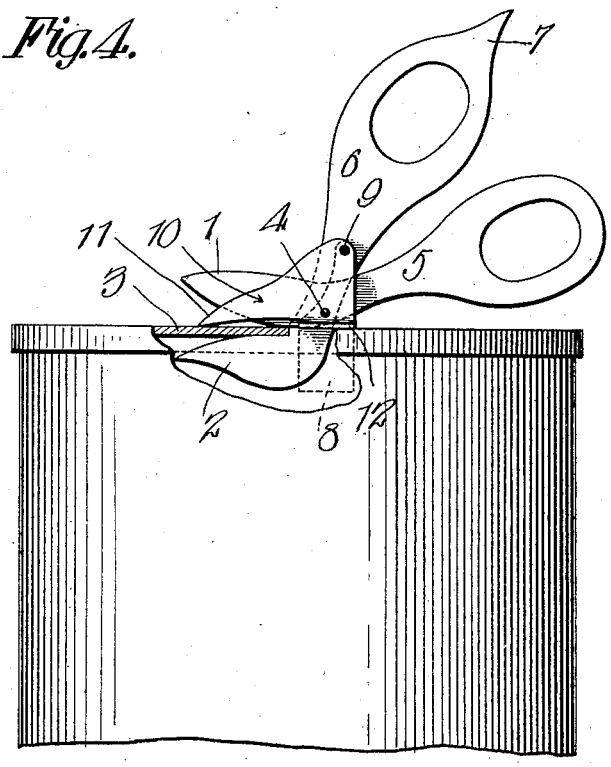
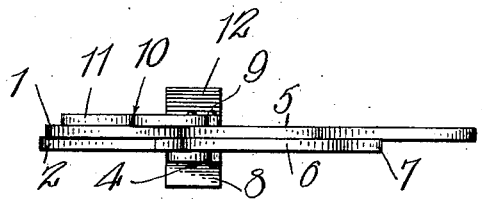
Inventor
Albert O. Hanson,

# UNITED STATES PATENT OFFICE.

ALBERT O. HANSON, OF RAY, NORTH DAKOTA.

CAN-OPENER.

No. 914,829.

Specification of Letters Patent.

Patented March 9, 1909.

Application filed August 26, 1908. Serial No. 450,298.

*To all whom it may concern:*

Be it known that I, ALBERT O. HANSON, a citizen of the United States, residing at Ray, in the county of Williams, State of North Dakota, have invented certain new and useful Improvements in Can-Openers; and I do hereby declare the following to be a full, clear, and exact description of the invention, such as will enable others skilled in the art to which it appertains to make and use the same.

This invention has relation to implements for cutting out the closure of one end of a can in which food is hermetically sealed, commonly known as "can openers", so that the contents can be decanted or taken out.

It is the object of the invention to provide improvements that will render the implement more efficient and readily operated, and that will guide the cutting devices regularly around the margin or end of the can without trouble or inconvenience.

The improvements are clearly and fully illustrated in the annexed drawings forming a part of this specification, which drawings show the preferred form of construction.

Figure 1:
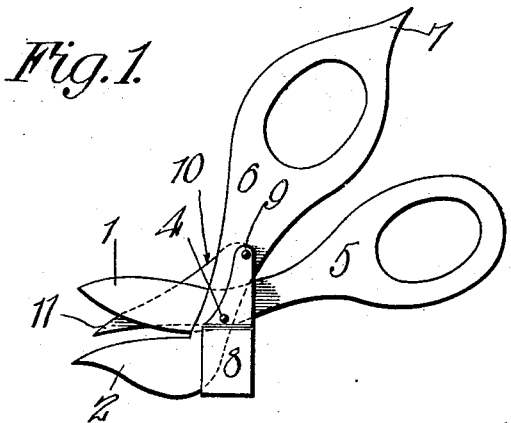
Figure 3:
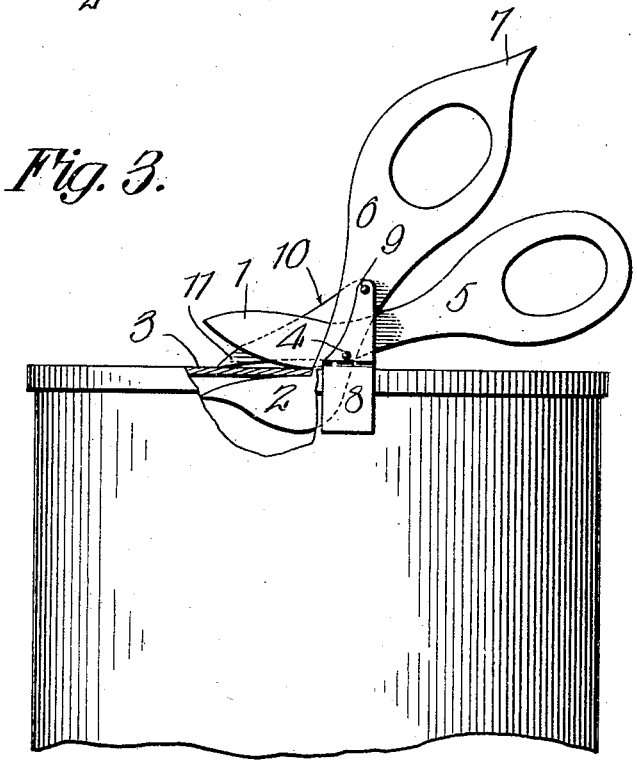

Of the said drawings, Figure 1 is a side elevation of the implement. Fig. 2 is a plan view of the same. Fig. 3 shows the implement applied, a part of the can being represented as broken away to more clearly illustrate the construction and mode of operation of the invention. Fig. 4 shows the side of the can opposite to that shown in Fig. 3.

Similar characters of reference designate similar parts or features, wherever they occur.

The implement which has a general scissors-like appearance, comprises two blades 1 and 2, so constructed and arranged as to effect a shearing cut of the closure 3 (or other portion of the can), with which they are brought into contact, the material of which the can is constructed being usually sheet tin. The two blades are pivotally connected by a pin 4 and are operated by the handle levers 5 and 6, with which they are formed integral, each handle terminating at its outer end in an eye portion. The eye-portion of the lever 6 is preferably formed with a point 7, which is utilized in making the initial incision in the closure. The blade 2 which tapers to a point, extends almost at a right angle to its lever, so that it may be projected into and may operate within the can, as shown in Fig. 3, the convex upper edge of the blade being sharpened, to form its cutting edge, while the cutting edge of the blade 1 is formed by its convex lower edge, the latter blade being disposed almost in alinement with its lever.

The blade 2 has disposed parallel with and in spaced relation thereto, the offset lower portion of a guide member 8 whose stem or upper portion is pivoted to the pin 4 and to one end of a second pin 9 which passes through the lever 6 alone. The first mentioned portion of this member is arranged to be moved along the outside of the can, to guide the blades in a circular course, and to prevent the same from cutting too far into the closure from its peripheral edge.

The lever 6 carries a dual-armed guide member 10, which is pivoted at its upper end to the other end of the pin 9, being thus disposed upon the opposite side of said lever from the guide 8. One arm 11 of this member is pointed, while the other arm 12 is bent outwardly in the opposite direction from the offset portion of the guide and coöperates therewith. The pointed arm may, like the point 7, be employed to punch a hole in the can top, and said arm also serves, in conjunction with the arm 12, to steady the implement during its operation and to prevent the severed portion of the closure from buckling up.

The implement is operated in the ordinary manner, like a pair of scissors or shears, as will be apparent, an extended description of such operation being considered unnecessary.

What is claimed is:

1. A can opener comprising a pair of pivotally connected levers; a blade formed upon the lower end of each lever; and a guide pivoted upon each side of one of said levers, one of said guides being adapted to steady the opener during its operation, and the other guide to direct the course thereof.

2. A can opener comprising a pair of pivotally connected levers; a blade formed upon the lower end of each lever; and an offset guide pivoted upon each side of one of said levers, the offset portions of the guides extending in opposite directions, one of said guides being adapted to steady the opener during its operation, and the other guide to direct the course thereof.

3. A can opener comprising a pair of pivotally connected levers; a blade formed upon the lower end of each lever; a dual-armed guide member pivoted upon one side of one of the levers, said member having one arm thereof pointed and the other arm offset laterally; and a laterally-offset guide member pivoted to the other side of said lever, the offset portion of this member extending in the opposite direction from the offset arm of the first named guide member.

4. A can opener comprising a pair of pivotally connected levers; a blade formed upon the lower end of each lever, one of said blades being arranged at right angles to its lever, and the other blade approximately in alinement with the other lever; and a guide pivoted upon each side of one of said levers, one of said guides being adapted to steady the opener during its operation, and the other guide to direct the course thereof.

5. A can opener comprising a pair of pivotally connected levers; a blade formed upon the lower end of each lever, one of said blades being arranged at right angles to its lever, and the other blade approximately in alinement with the other lever; and an offset guide pivoted upon each side of one of said levers, the offset portions of the guides extending in opposite directions.

6. A can opener comprising a pair of pivotally connected levers; a blade formed upon the lower end of each lever, one of said blades being arranged at right angles to its lever, and the other blade approximately in alinement with the other lever; a dual-armed guide member pivoted upon one side of the first named lever, said member having one arm thereof pointed and the other arm offset laterally; and a laterally-offset guide member pivoted to the other side of said first named lever, the offset portion of this member extending in the opposite direction from the offset arm of the first named guide member.

In testimony whereof, I affix my signature, in presence of two witnesses.

ALBERT O. HANSON.

Witnesses:
M. J. CARR,
FLORENCE CARR.